(12) United States Patent　　(10) Patent No.: US 12,220,796 B2
Macy et al.　　(45) Date of Patent: Feb. 11, 2025

(54) LOW PROFILE CLAMPING DEVICE

(71) Applicant: 3D Systems, Inc., Rock Hill, SC (US)

(72) Inventors: William D. Macy, St. Peters, MO (US); Nathan D. Eversole, Colorado Springs, CO (US)

(73) Assignee: 3D SYSTEMS, INC., Rock Hill, SC (US)

( * ) Notice: Subject to any disclaimer, the term of this patent is extended or adjusted under 35 U.S.C. 154(b) by 393 days.

(21) Appl. No.: 17/731,214

(22) Filed: Apr. 27, 2022

(65) Prior Publication Data

US 2022/0347820 A1　　Nov. 3, 2022

Related U.S. Application Data

(60) Provisional application No. 63/182,894, filed on May 1, 2021.

(51) Int. Cl.
　　*B25B 5/00*　　(2006.01)
　　*B25B 5/16*　　(2006.01)
　　*B33Y 30/00*　　(2015.01)
(52) U.S. Cl.
　　CPC ................. *B25B 5/16* (2013.01); *B33Y 30/00* (2014.12)

(58) Field of Classification Search
　　CPC .. B25B 5/00; B25B 5/16; B25B 5/101; B25B 5/125; B25B 5/082
　　See application file for complete search history.

(56) References Cited

U.S. PATENT DOCUMENTS

| 1,280,013 | A | * | 9/1918 | Goddard | F16M 13/02 |
| | | | | | 403/90 |
| 4,140,307 | A | * | 2/1979 | Dalmau | B23Q 1/50 |
| | | | | | 269/97 |
| 4,353,537 | A | * | 10/1982 | Koufos | B25B 1/241 |
| | | | | | 294/902 |
| 2021/0131457 | A1 | * | 5/2021 | Sargesjan | F15B 15/18 |
| 2023/0143498 | A1 | * | 5/2023 | Bjoerk | B25B 5/16 |
| | | | | | 269/2 |

OTHER PUBLICATIONS https://www.youtube.com/watch?v=-Xm1jd7_of4 Date: Jul. 2017.*

* cited by examiner

*Primary Examiner* — Lee D Wilson

(57) ABSTRACT

A clamping device is disclosed having a rigid frame and a concavity for accepting items to be clamped together, a clamping action upon items entering into the concavity being facilitated by a contacting member in conjunction with a force-maintaining member and a displacement-limiting element to readily accommodate a range of clamped item dimensions without requiring separate opening or tightening adjustments to be performed by a user while applying the clamping device.

7 Claims, 8 Drawing Sheets

LOW PROFILE CLAMPING DEVICE

RELATED APPLICATIONS

This application claims the benefit under 33 U.S.C. 119(e) of provisional application No. 63/182,894 which was filed with the United States Patent and Trademark Office on May 1, 2021 and which is incorporated by reference herein in its entirety.

FIELD OF THE INVENTION

The invention relates to devices for applying clamping force to hold one or more items in contact with one another, especially in confined spaces.

BACKGROUND

Many types of clamping devices are used in a variety of applications for creating points of attachment and for pressing objects into contact with one another. For example, in woodworking, planks of wood are often clamped against one another place just prior to gluing or fastening them together using nails or screws. Likewise, in metalworking, sheets of metal are often clamped against one another place just prior to welding or applying fasteners such as rivets to join the pieces or in the course of welding the pieces together. In yet other applications, clamping is used to temporarily hold an item rigidly in place such as when a piece of raw material is clamped to the 'bed' of a CNC machining system and subjected to forces by cutting tools.

Many of the common manually-applied clamps employ screw threads, ratchets, levers and the like as the main principal for tightening and holding and are typically designed to accommodate a wide range of opening sizes. Handles and knobs for actuating these clamps must necessarily be large enough to be operated by human hands or fingers and may further be designed to provide adequate mechanical advantage so that using the clamp does not require extraordinary strength.

Toggle clamps and so-called 'vise grips' operate using articulating linkages to move from a open-jawed non-clamping position into a closed-jawed fixed position. Any 'give' or springiness in the clamping force is due to distortion of the linkages or at joints therebetween.

Spring force clamps are also widely used, ranging from large hand clamps, which require considerable grip from a user's hand to open, down to so-called binder dips' made of curved spring steel that are commonly available from office supply stores. Although the latter are intended for holding thick stacks of paper together, are often pressed into use for many other tasks. Unfortunately, opening of the spring steel binder dips with their narrow wire handles puts uncomfortable concentrated force on an operator's fingertips and limits the usable clamping forces.

In the case of larger spring-force clamps that are manually operated, sizable grips are needed for a user's hand to overcome the spring-applied clamping force and to open the jaws of the clamp to accept the item or items to be clamped. Once applied, the gripping force (a) varies depending on the combined thickness of the clamped items and (b) is limited due to the need for a user to be able to overcome the spring action forcing the jaws together.

While clamps of many varieties are well known and sufficient for common uses, some recently emerging scenarios in modern manufacturing introduce new constraints such that existing clamps do not adequately address.

Particularly In the context of large format 3D printing, wherein solid objects are formed by extruding thermoplastics in successive layers upon an initial build surface (possibly in conjunction with machining to remove some extruded material) a need arises to firmly and securely clamp a removeable sheet of build surface material, such as 6 mm thick polycarbonate sheet, against a metal 'print bed' or 'build plate', which may be a 12 mm thick metal plate measuring, for example, 1 meter square. In this application, the conventional clamps discussed above create a number of problems. When applied around the periphery of a flat sheet of build surface laying atop a flat metal plate, typical clamps (owing to the need for handles) can occupy too much space and extend too far beyond the surface that is facing upward towards the extruding head and/or machining tool heads. They may also protrude in other directions and cause interference or damage as the automated machinery moves about. If the massive and fast-moving tool heads of such a machine collide with a clamp attached to the build plate, the result can be damage to the tool heads, the clamp, the build surface or even to the costly precision mechanisms that support and drive the tool heads. Another ill effect of interference or collision is that a moving tool head can cause a lateral shifting in the build surface relative to the build plate or the knock the tool head out of positional registration. If this happens while a build process is underway, tool positioning is no longer calibrated relative to the workpiece and subsequent addition or removal of material occurs in the wrong locations. This occurrence can undermine part quality, resulting in scrapping the build, wasting of material and machine time and possibly expensive down time and repairs. This environment gives rise to a need for clamping devices that are exceptionally compact yet strong and heat-tolerant given that many of these manufacturing processes are performed at elevated temperatures.

BRIEF DESCRIPTION OF THE DRAWINGS

Various exemplary embodiments are illustrated by way of example, and not by way of limitation, in the figures of the accompanying drawings, in which like reference numerals refer to similar elements and in which.

DETAILED DESCRIPTION

In the following description, for the purposes of explanation, numerous specific details are set forth to provide a thorough understanding of illustrative and preferred embodiments of the invention. It is apparent, however, that some embodiments may be practiced without these specific details or with alternative, equivalent arrangements. In some instances, more common structures and devices are excluded from view or shown in block diagram form to avoid unnecessarily obscuring components that are more essential for illustrating embodiments of the invention and its operating principles.

As used herein, the term 'clampable assembly' refers to a what would normally be considered a 'workpiece' or an assemblage of 'items of be clamped' whether that is a singular item to be clamped onto or multiple items needing to be clamped together. In the example usage scenario explained below, when a build surface is to be clamped to a build plate, they enter the clamp alongside one another and may be collectively referred to as a 'clampable assembly'.

As used herein, the term 'spring force' will refers to a force applied by any of a variety of sources (such as those listed in the following sentence) and which allows for some positional displacement to occur along the line that the force is applied. The spring force may remain applied and remain relatively constant or linearly change as such displacement occurs and preferably remain constant for as long as the amount of displacement remains constant. Examples of sources of mechanisms that can supply a 'spring force' include a coil spring, leaf spring, Belleville washer, or mechanisms which involve deflection of nearly-rigid structures; compression or deformation of a compliant or 'rubbery' material such as thermoplastic polyurethane, neoprene, Buna-N or the like; a slidable piston or membrane forced by a pressurized gas or liquid.

Figure 1:
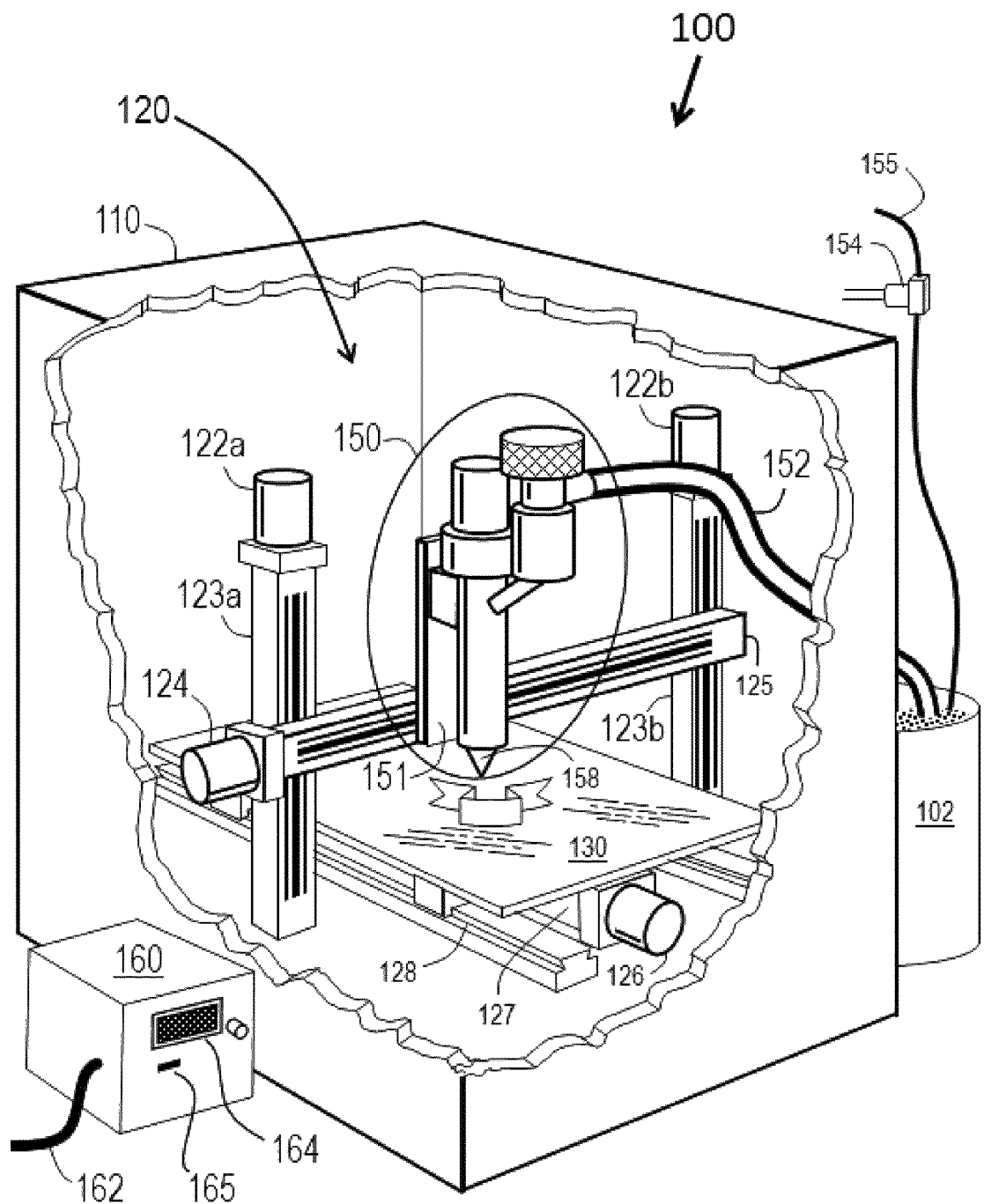
FIG. 1 is a pictorial of an enclosed multi-axis motion control system as an example environment for use of the present invention.

To provide an example context in which various embodiments of the present teachings offer advantages over the known art, FIG. 1 depicts an enclosed fused deposition modeling (FDM) system 100. System 100 is shown to comprise a motor driven multi-axis motion control system 120 which controllably moves extruder head 150 relative to build plate 130. The motion control componentry combined with extruder head 150 constitute a fused deposition modeling system, that is, a form of 3D printer. Multi-axis motion control system 120 as shown creates movement along three orthogonal axes in an arrangement known as a 'Cartesian coordinate system' wherein any point within the build space is referenced by a unique triplet of scalar values corresponding to displacement along three mutually orthogonal axes.

Extruder head 150 is shown to be attached to a carriage 151 that is controllably moved along the long axis of transverse beam 125 by the rotation of the shaft of an X-axis motor 124. Typically, beam 125 will comprise one or more linear bearings facilitating the smooth movement of carriage 151 parallel to the long axis of beam 125. Furthermore, beam 125 may house a lead screw (not distinctly visible in the diagram) which is coupled to carriage 151 by a precision nut, fixed within the beam 125 by rotary and thrust bearings and coupled to the shaft of X-axis motor 124. The rotation of the shaft of X-axis motor 124 may rotate the lead screw which, in turn, will cause carriage 151 to move closer to or further away from motor 124 in a controlled manner.

Whereas the arrangement of motor 124 and beam 125 accomplish controlled movement of the extruder head 150 in what may be termed the horizontal X-axis in the print-space coordinate system, motors 122A, 1228 and their respective columns 123B, 123A may use a similar arrangement of linear guides, bearings and lead screws such that Z-axis motors 122A, 122B controllably move extruder head 150 in a vertical direction, that is, closer to or further away from build plate 130. More specifically, beam 125 may be attached to carriages (hidden) that couple to lead screws within columns 123A and 123B. As Z-axis motors 122A and 122B rotate their respective lead screws in synchrony, the entirety of beam 125, X-axis motor 124 and extruder head 150 are caused to move upward or downward.

To accomplish yet another motion of build plate 130 relative to extrusion head 150, a third motor, which may be referred to as Y-axis motor 126 may act upon a lead screw 127 to which the build plate 130 is coupled. The rotation of the shaft of motor 126 controls the position of build plate 130. Build plate 130 may be supported by, and may slide or roll along, linear bearing rails such as rail 128.

It should be understood that the arrangement of motors, bearings and such depicted in FIG. 1 is merely one example of achieving controlled relative motion between extruder head 150 and build plate 130 such that an object is formed by the extrusion of materials through nozzle 158. Various other arrangements are common and equally suitable as an embodiment in which the present invention may be applied.

In addition, it should be understood that, for simplicity, FIG. 1 excludes many fasteners, brackets, cables, cable guides, sensors and myriad other components that may be employed in the manufacture of such systems but which are not essential for explaining the principles of the present invention nor for describing the best mode thereof. Where linear guides and lead screws have been described, it should be understood that the present invention is not limited to being applied to machines that use such mechanisms and that, for example, belt driven systems and gear driven systems are equally suitable for use and susceptible to the challenges that the present invention addresses.

The role of extrusion head 150 is to receive plastic in pellet form driven by bursts of air through a feed tube 152 and to melt the plastic and drive it out of the end of nozzle 158 in a continuous stream. Typically, plastic pellets are stored in a large external pellet reservoir 102 and provided to the extruder head 150, via bursts of air, in small increments as needed.

To accomplish the formation of a solid object in three dimensions upon the build plate 130 from extruded materials emanating from the tip of nozzle 158, a control box 160 is provided with electronics, such as a microprocessor and motor drive circuitry, which is coupled to the X, Y and Z motors as has been described above, as well as to numerous sensors and heating elements, in the system 120, some of which will be described further below in connection with FIG. 2. Electronics within control box 160 also control an extruder motor, to be described below. Some examples of suitable control electronics which may operate within control box 160 are the RAMBo control board (manufactured by UltiMachine Corp. of South Pittsburgh, Tennessee) running Marlin firmware and so-called 'Smoothie boards' executing open-source Smoothieware firmware which is ubiquitously produced based upon open source design files. For providing a human-accessible control interface, essentially all of the available control boards support an LCD display and user interface 164, as is shown to be a part of control box 160 in FIG. 1. The electrical power to drive the control box 160 and the motors sensors and heating elements of system 120 comes from a connection to electrical power lines 162.

In many applications, build plate 130 is heated to a controlled temperature, most commonly using electrical resistance heating elements (not visible in the diagram) which may be mounted under the bed and thermally coupled thereto. To facilitate 3D printing with certain types of thermoplastics, such as ABS or PEI, the temperature within enclosure 110 may be elevated over typical room ambient temperature by the addition of yet other heating elements (not shown) or simply by the heat incidentally dissipated from build plate 130. Furthermore, for printing certain thermoplastics, a specific build surface may be plate chosen to promote adhesion, so metal build plate 130 may be overlaid with a detachable sheet or slab of build surface material such as glass, polycarbonate, polymethylmethacrylate, polyetherimide, or the like. This practice is described further below.

With respect to FIG. 1, it is important to note that the space within the chamber 110 is very limited and clearance between the walls of the enclosure 110 and the enclosed motive system 120 is minimal. More often than not, in large systems, there is only one opening by which an operator may gain access and, because of the limited space, automatically moving machinery and often elevated internal temperatures, it is difficult for an operator to enter and step to the back of the enclosure to reach behind or under the build plate, especially along the edge furthest from a front-side doorway (not shown) into the chamber. For many reasons, it is preferable to avoid having to access the farthest parts of the machine when attaching or removing a build surface on a build plate.

It should also be apparent that the vicinity around build plate 130 is even more constrained on several sides—on top by the passage of extruder head 150 in close proximity, along the sides by columns 123*a,b* and underneath by bearings, motors (126,127,128) and possibly elsewhere by cabling runs and other features. Clearance underneath the build plate is also limited by proximity to the floor 111 of the enclosure upon which all of the foregoing mechanisms are mounted.

Figure 2:
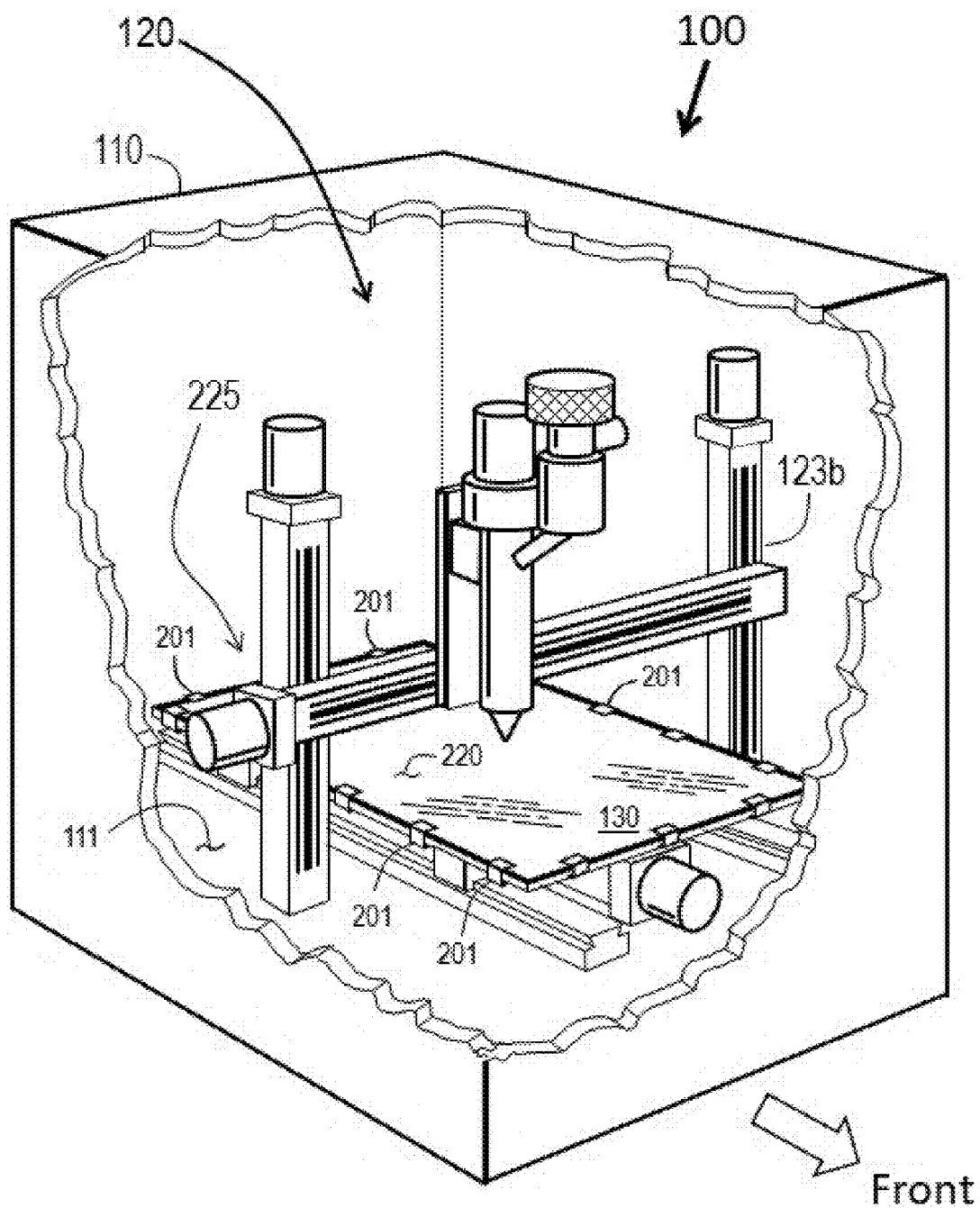
FIG. 2 is a pictorial showing example locations where clamping devices that embody the present teachings may be deployed.

FIG. 2 of the drawings is a simplified version of FIG. 1 to more clearly show where, in this context, clamps that have been designed, formed and applied according to the present teachings are advantageously deployed.

In FIG. 2, build plate 130 is shown to be topped by a detachable build surface 220. For example, a heated build plate made of aluminum and measuring approximately 1 m×1 m×12 mm thick may need to be overlaid with a same-size sheet of polycarbonate that is 6 mm thick. This overlay presents a suitable bonding surface for many thermoplastics, either as-is or upon application of an intermediary coating such as an adhesive or slurry of dissolved plastic.

To ensure that the detachable build surface 220 stays securely attached to build plate 130 as it moves and the build proceeds, a series of clamps 201 need to be applied around the periphery of the build plate. This practice also assures that build surface 220, which tends to be somewhat flexible and prone to warping, is forced to remain flat against the much flatter, stiffer build plate 130.

Figure 3:
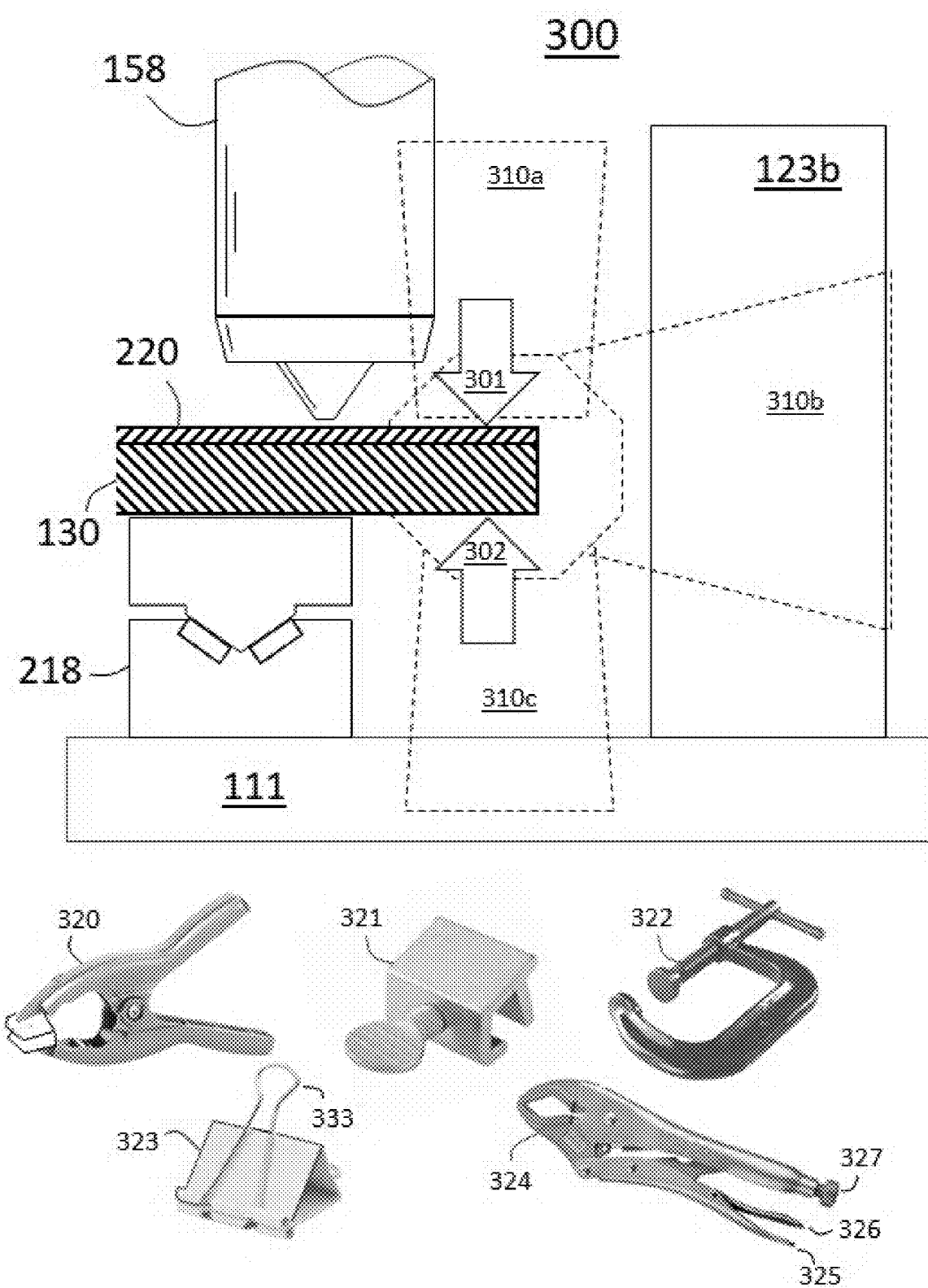
FIG. 3 is a conceptual diagram of the environment of FIG. 1 to illustrate how existing clamping devices interfere with surrounding components.

FIG. 3 presents a conceptual view 300 of the constrained space within which clamp 201 must operate and illustrates why existing clamps do not work adequately. FIG. 3 is from a point of view as if one were sighting down the edge of the build plate that passes closest to column 123*b*. Build plate 130 and build surface 220 are shown as cross-sectioned slabs. Arrows 301 and 302 depict the forces that need to be applied to press and hold detachable build surface 220 firmly against build plate 130 so that the former does not lift away from or slide around on top of the latter.

For reference, several components in FIG. 3 were those introduced in FIG. 1, namely, extruder 158 column 123*b*, and linear bearing rail 218, as well as enclosure floor 111. Extruder 158 is shown with its nozzle shown lowered very close to the build surface, as is the case during the first layers of an extrusion/deposition build process.

A series of regions 310*a*, 310*b*, 310*c* indicated by dotted outlines represent the space occupied by various types of well-known clamps that would otherwise be considered for clamping two flat slabs together.

For visual reference (though not to scale) FIG. 3 also provides examples of existing clamps one might consider. A heavy-duty spring-loaded handle clamp 320 would, if applied to clamping where arrows 301 and 302 are shown, protrude into the outlined space represented by dotted line 310*b*. This would interfere with movement of build plate 130 past column 123*b* as it glides to-and-fro atop linear bearing rail 128.

A small clamp 321 of the type often used for securing sliding windows disposed within metal frames might be used in some form, but the thumbscrew shown would protrude along outlines 310*a* or 310*c* Even though pointing the thumbscrew downward seems acceptable, the act of attaching is awkward or impossible to achieve along the back edge 225 (see FIG. 2) especially considering that an operator of the machine would have to climb to the back of the enclosure and then reach underneath the build plate. This orientation also risks collision with undercarriage components such as rail 128 as the user may not be able to see the rail underneath and may inadvertently set the clamp at a location that causes it to strike the end of the rail as the build plate is moved. It is recognized that the thumbscrew could be replaced with a set screw that has negligible protrusion but this introduces the problem of having to align an Allen wrench or other tool with the set screw while reaching blindly underneath the build plate at some locations, such as along the back edge 225. This process would be tedious and inefficient, as well as more hazardous to perform while the build plate or enclosure is hot.

As yet another possibility, one might select a screw clamp 322 (or a bar clamp which exhibits a very similar outline.) Screw clamp 322, also known as a 'C' clamp, will encroach into outlined regions 310A or 310C, not only because of the long, threaded shaft but also due to the transverse handle atop the shaft which can come to rest and protrude along other problematic directions.

Another popular form of clamp that holds tight and yet releases more abruptly than screw type mechanisms is shown as vise grip pliers 324. Clearly, because of the need to provide a clamping lever 325, a release lever 326 and an opening adjustment screw 327 that are all operable by hand, vise grip pliers 324 must remain at a respectable physical size and must therefore occupy space along outline 310*b*. This neglects to mention the considerable mass that several such devices would add to the build plate.

Finally, a simple office binder clip 323 may be considered for use, given that some larger sizes are available that could accommodate the range of combined build surface and build plate thicknesses anticipated—around 10-25 mm. Binder clip 323 can be especially problematic because the spring steel clip portion can seat into different positions every time it is attached. Sometimes the dip may stick upwards into the area corresponding to outline 310a. Furthermore, the wire handles 333 are configured to swivel and will either protrude outward along outlined areas 310a and 310c or, perhaps worse, lay flat against the clamped pieces, risking collision with extruder head 158 or other components. While it is possible to remove the wire handles after installing a binder clip, the process of safely removing the clip after use requires reinserting the handles—a tedious process under the best of conditions and made worse when there is no line-of-sight access.

Another problem with common binder clip 323 is operator fatigue, because the only point at which a user can apply force to open the dip is a narrow wire handle 333. Furthermore, the force required to open the binder clip far enough to accept the clamped pieces varies dramatically with overall thickness, as does the achievable clamping force.

Clearly, all of the clamps considered above risk detrimental contact with surrounding structures. In the context of a large-scale 3D printer such as system 100, having a nozzle or other parts of the moving extruder head collide with a clamp could be disastrous. If such a system also employs a multi-axis machining (material removal) head, even greater problems are possible. A mispositioned or protruding clamp may get itself caught up in a spinning blade or bit or deflect the tool head so that it digs into workpiece in the wrong places. In some cases, a clamp firmly anchored to a moving build plate can collide with or snag upon other components that are around and underneath the build plate, causing wear or catastrophic damage to bearings, belts, motors, sensors, cables and leading to costly repairs and downtime.

At the very least, in the event of collision with one of these moving heads, the clamp may be unseated and knocked off, reducing how securely the build surface is attached. In somewhat worse scenarios, the nozzle and extruder section—or even the 'carriage' by which the extruder is coupled to the motion control machinery—can be damaged.

Another possible detriment is that collision between a tool head and a clamp may momentarily stall the motion of the machinery, even as motors are acting to apply motive forces. This can be especially problematic in the case of so-called 'open loop' systems which employ stepping motors or the like. These systems send current pulses to the motors and assume that the respective axes moved as directed. Unlike with closed loop systems, the controller does not receive ongoing feedback as to the true position of moving components, nor is the controller able to issue corrective signals on-the-fly. The positional integrity of an open loop system is also an issue for motion systems that utilize toothed belts and pulleys. When positional registration is disrupted during a large-scale build, this can mean hours or days of wasted machine time and wasted raw materials at considerable cost.

Figure 4A:
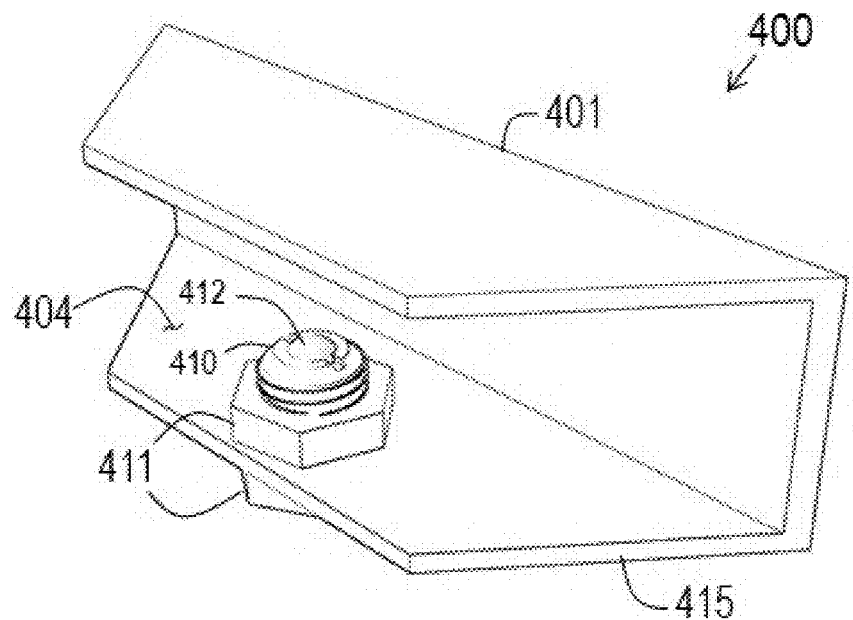
FIGS. 4A-4B show the design of a low profile clamping device in accordance with a preferred embodiment of the present teachings.
Figure 4B:
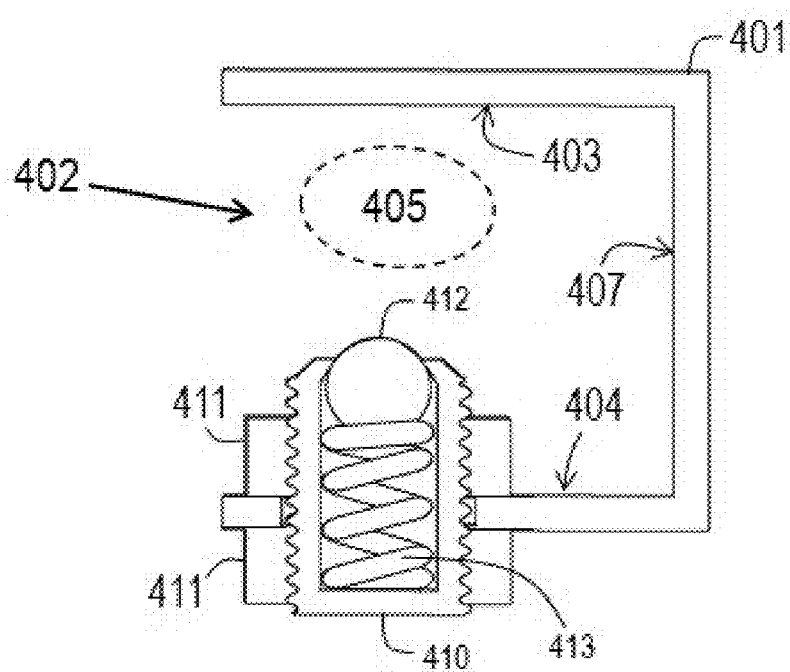

FIG. 4A (a perspective view) and FIG. 4B (a cross-section view) show a clamp apparatus 400 that comports with various aspects of the present teachings in providing an exceptionally compact clamp. This design achieves compactness in part by eliminating many of the features, such as handles, that are normally required for manual placement and adjustment to achieve a tight clamp action. Unlike general purpose clamps which must accommodate—with every single instance of use—a range of possible opening sizes when clamped, the present teachings are in recognition of the consistency of the clamped dimension (the sum of the build surface and build plate thicknesses) over many cycles of usage, eliminating the need to make any adjustments to the clamp for as long as the same nominal thicknesses are in play. A clamp apparatus according to the present teachings is preferably devoid of any protruding handles or the like.

Furthermore, in accordance with various embodiments, a clamp involves a limited range of opening motion which encompasses the expected thickness dimension to be clamped, allowing the clamp to simply be shoved into engagement with the edges of the clamped items-without any manual opening or separating of the clamp members as a preparatory step. It is envisioned that a user may cup the overall clamp frame in their hand and simply shove the opening against the aligned edges of a build surface and build plate. Where stiffer clamping forces are used, this insertion maybe augmented by tapping the 'back' of the clamp with a small hammer. Moreover, the recommended design also eliminates the need for manual closing or tightening and yet achieves a strong clamping force once attached.

Clamp apparatus 400 comprises a rigid clamp frame 401 which may be formed, for example, from an extruded metal 'U' shaped channel or the combination of two 'L' shaped extrusions which are joined together using fasteners. For rigid clamp frame 401 may be made of a variety of materials (steel, aluminum, iron, brass) and may optionally undergo various processes (such as drop forging or heat treating) to achieve a desired level of strength and stiffness. In practice, a sufficiently thick-walled extruded channel, such as an aluminum channel having a ⅛" wall thickness (McMaster cat #9001K688) has proven adequate. A wide variety of materials, processes and finished shapes are known and may be used to adequately achieve a clamp frame within the scope of the present teachings.

Clamp frame 401 comprises a concave opening or concavity 402 into which items to clamped are inserted. Clamping action will generally take place in the approximate middle region 405 the concave space. Concavity 402 is surrounded by clamp frame 401, with specific inward-facing aspects being a first inward face 403 which constitutes one point of contact for applying force to the items to be clamped and a second inward face 404. A third face 407 is also shown as part of the frame and likewise facing into the concavity. Face 404 does not need to articulate to meet come into contact with items to be clamped but instead comprises a protruding component (having various designs exemplified herein) for contacting the items and exhibiting specific orientation and motion characteristics as will be explained shortly.

In FIGS. 4A-4B, the inwardly protruding component is shown be a ball nose spring plunger 410, such as at Cat #3408A149 available from McMaster-Carr. The particular model spring plunger specified above doubles its force from 9 pounds to 18 pounds over a short travel of less than 0.1". A stack of plates to be clamped together, having a combined thickness within a narrow range, can wedge into place displacing the ball against the spring force and achieving an 18 pounds of force at the tip of the ball. It is contemplated that, if a greater final clamping force is desired, multiple spring plungers may be similarly installed along face 404.

Spring plunger 410 is adjustably attached to frame 401 along face 404 using nuts 411 on either side of a hole through face 404. Nuts 411 may be, for example, thin hexagonal nuts such as McMaster Cat #94846A533. For a given nominal thickness for items to be clamped, spring plunger 410 is adjusted and nuts 411 are tightened such that the clamped items will engage ball 412 and force it to recede into the plunger housing (against the force of the spring inside the housing) as the items fully enter concavity 402.

As the aligned items to be clamped (the 'clampable assembly') enter together and drive the ball downward, the clamping force rises as a function of the spring constant of spring 413. The items initially engage the ball somewhat off-center, while the ball is at its extended travel limit and is subject to less outward force. As the items drive further inward and the ball 412 rolls and get pressed into the housing, the spring force on ball 412 may increase sharply just as the incoming clampable assembly gains significant mechanical advantage to overcome the spring force. (This action is shown and described further in conjunction with FIGS. 6A-6C.) Lateral friction is also reduced due to the rolling ball.

Also evident in FIG. 4A are tapered ends 415 on frame 401. In accordance with preferred embodiments of the present teachings, especially when a rolling ball plunger is utilized as a spring-driven contact member, tapered ends 415 facilitate aligning the elongated clamp channel with the edges of the clampable assembly, especially as the clamp is 'palmed' by a user and coarsely positioned. The clampable assembly is able to settle into the concavity to some extent before they contact with the rolling ball and a greater insertion force becomes necessary. Yet another aspect evident in FIGS. 4A-4B is that ball 412 is preferably recessed by a distance within the concavity or set back from the opening so that the clampable assembly may enter the concavity and begin to seat against inner face 403 before encountering ball 412 or a similar contacting element.

Whereas FIGS. 4A-4B have thus far illustrated but one embodiment, a variety of designs are possible involving combinations of the following attributes that are characteristic of the present teachings.

In accordance with various preferred embodiments, the second inward face comprises a limited-displacement contacting component, such as a spring plunger, which comprises a deformable force-maintaining element (such as a spring or a compressible rubber or plastic piece) which applies a closing force to the contacting member to drive it towards the first inward face. In the case of spring plunger cited above, an internal coil spring provides such force and undergoes deformation as the ball is displaced by items entering the concavity. (This action is shown and described further in conjunction with FIGS. 6A-6C.)

In accordance with various preferred embodiments, the limited-displacement contacting component further comprises a rotatable contacting member which contacts a surface of clamped items and, as the clamped items are pressed into full engagement within the clamp concavity, rotates about an axis perpendicular to the direction at which clamped items are inserted into the concavity. To reduce fiction and wear and to facilitate insertion, the rotatable contacting member preferably rolls upon the surface of the clamped items for a short distance until the clamp items come to rest fully within the clamp.

In accordance with various preferred embodiments, the limited-displacement contacting component further comprises a closure limiting element, acting in opposition to the aforementioned closing force, to restrict the trawl of the rotatable contacting member towards the first inward face. This element provides for a fixed gap between the rotatable contacting member and the first inward face such that an assemblage of clamped items entering the concavity are not blocked from entering the cavity but do come into contact with the rotatable contacting member and cause it to be displaced by overcoming the closing force. In FIG. 4B, a constricted opening 416 at the end of spring plunger housing prevents ball 412 from moving beyond a certain point. The constriction of the opening serves as a closure limiting element and allows adjustment of the overall spring plunger 410 relative to face 404 to also determine the minimum opening gap between ball 412 and face 403.

In accordance with various preferred embodiments, the clamp assembly comprises a closure adjustment feature that provides for setting the location of the limited-displacement contacting component relative to the second inward face so that its range of motion results in a range of opening sizes that encompass a given nominal combined thickness of items to be clamped.

In some implementations, the limited-displacement component may penetrate the second inward face 404 portion of the clamp frame 401 and be fixed in place by the tightening to a fixed, but repositionable, depth to set the minimum and maximum openings afforded by movement of the rotatable contacting element, as constrained by the closure limiting element. As shown in the example, threaded nuts 411 in combination with the threaded housing of spring plunger 410 provide for the closure adjustment feature of the particular example design shown in FIGS. 4A-4B. When a different combination of stacked items needs to be accommodated having a different combined thickness, nuts 411 may be turned to a different location along the outer threads of the spring plunger 410 and then tightened to fix the minimum and maximum opening dimensions. The effects of such adjustment may be more clearly understood with reference to FIGS. 6A-6C below.

Figure 5:
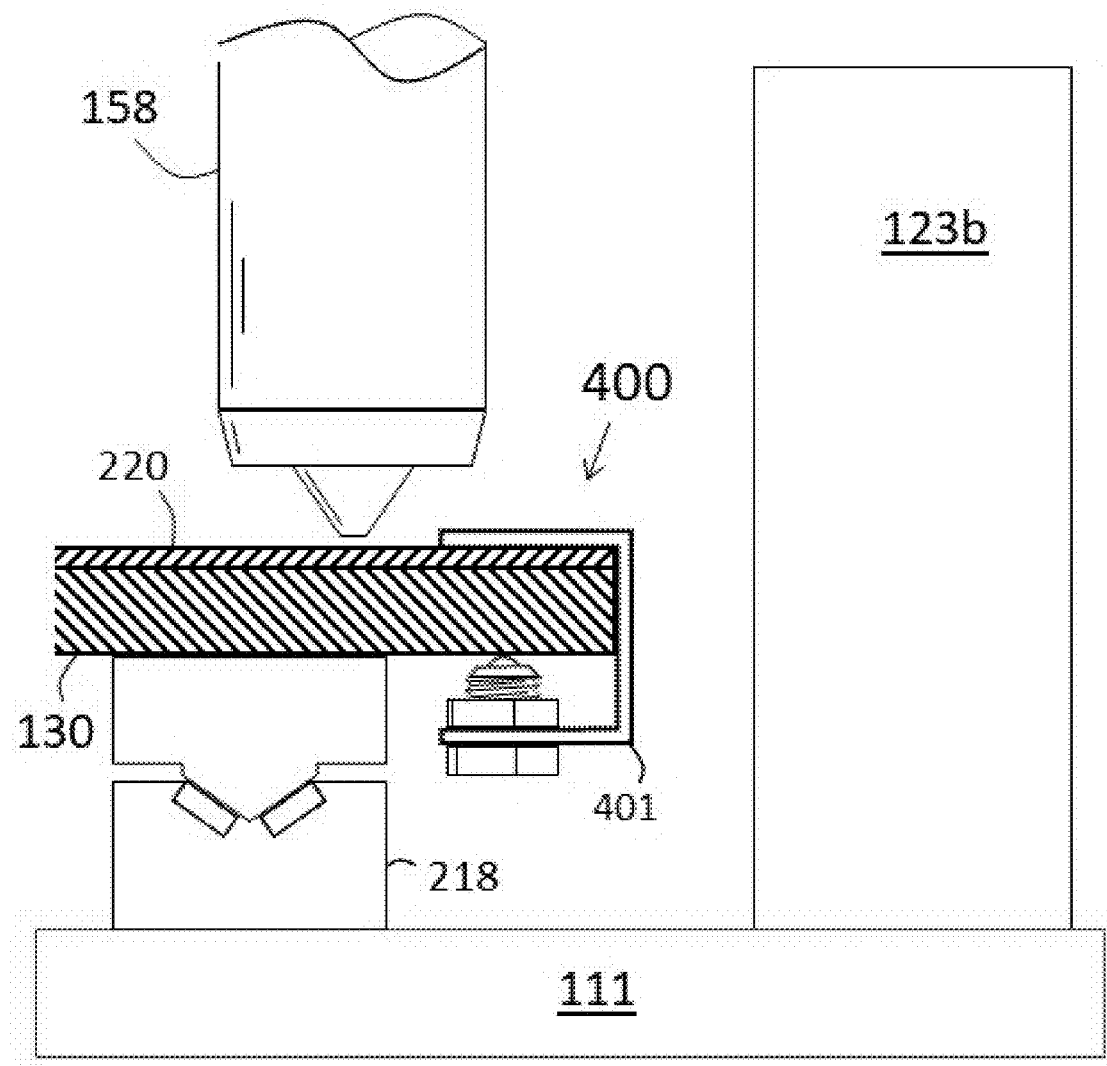
FIG. 5 is a conceptual diagram of the environment of FIG. 1 to demonstrate the clearance achieved by a clamping device made and applied in accordance with a preferred embodiment of the present teachings.

As a brief aside, FIG. 5 illustrates how a clamping device 400, as shown and described in FIGS. 4A-4B, may be applied to clamping a build surface to a build plate within the same surroundings as were introduced in FIG. 3. In general, clamp 400 is shown to occupy far less space around the point of attachment, compared to conventional clamps, and does not interfere with other system components to any significant degree. Clamp 400 lacks handles or other features common to manually settable clamps that would otherwise extend into the regions that were designated by dotted lines 310*a,b,c* in FIG. 3. Even with respect to an extruder nozzle, clamp 400 may interfere with access to specific locations at the very outer edge of the build surface, but the nozzle is able to approach much closer to the edge than if the broader body of extruder 115 were to meet with a conventional clamp handle within region 310*a*. In accordance with a preferred embodiment, clamping device 400 extends less than 4 mm 'upward' into the region 310*a* shown in FIG. 3, less than 6 mm in the direction of region 310*b* (once the clamp is seated fully such that the clamped edges shown contact face 407) and less than 40 mm 'downward' towards region 310*c*. The present teachings are not inherently limited to these dimensions but the choice of components listed herein by example does achieve a profile that is well within these constraints.

Figure 6A:
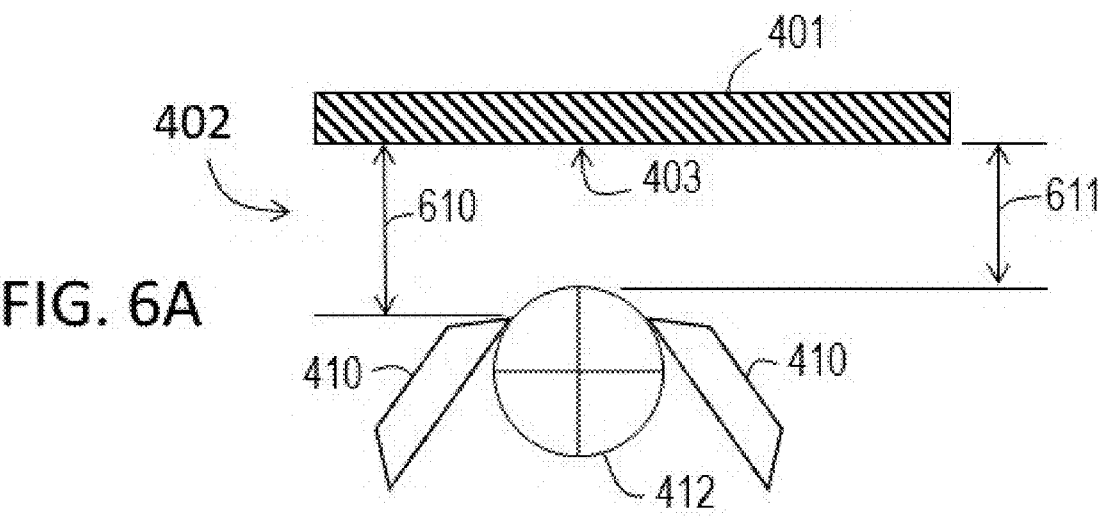
FIGS. 6A-6C depict a close-up analysis of moving parts as a clampable assembly is inserted into a clamping device that has been made and applied in accordance with a preferred embodiment of the present teachings.
Figure 6B:
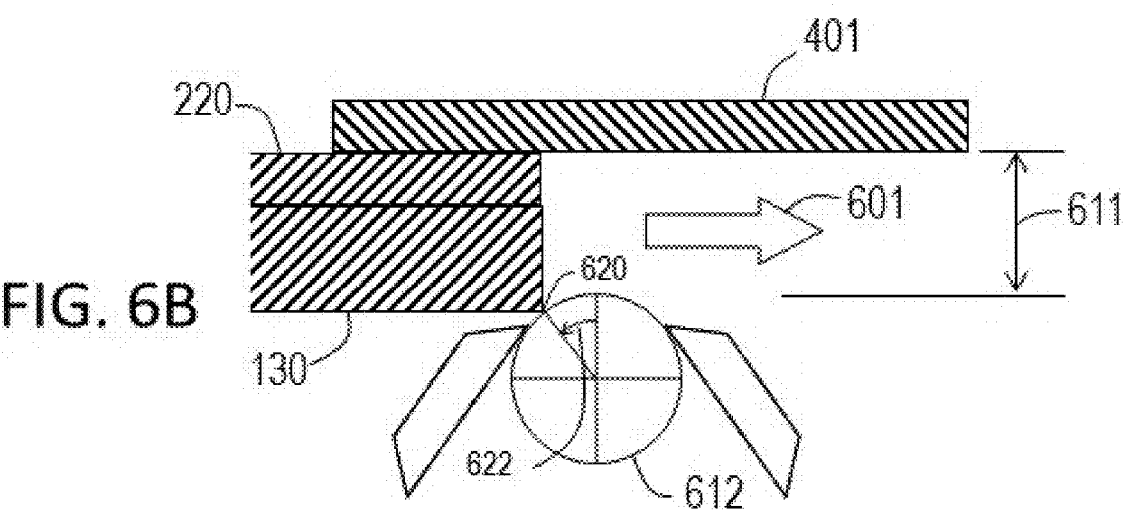
Figure 6C:
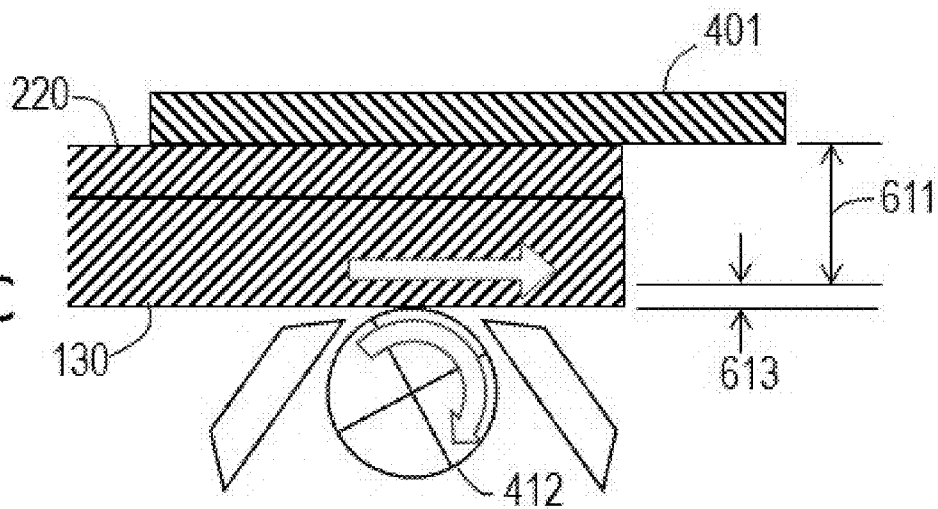

FIGS. 6A-6C show the relative locations of various parts as a 'clampable assembly'-stack of one or more items to be clamped—enters into the grip-involved parts of a clamp that is constructed and adjusted in accordance with preferred embodiments of the present teachings. Each of these drawings excludes the surrounding clamp frame and focuses on what occurs right at the gap between the first inward face 413 and ball 412 as the clampable assembly (comprising a build surface stacked on a build plate) is introduced into the concavity and then forced past the point where the ball imposes a constriction.

FIG. 6A shows the key components that establish the clamp opening before the entry of clamped items. As explained before, the part of clamp frame 401 that faces and contacts the clamped items is first inward face 403, which effectivity acts as one 'jaw' of the clamp opening. On the opposite side of the opening are components representing the tip of spring plunger 410, namely ball 412 and the uppermost portion of the housing of spring plunger 410. Ball 412 becomes the complementary point of applying gripping forces to clamped items in opposition to face 403. Ball 412 might be considered as the opposite 'jaw'. Note that ball 412 is constantly subject to force towards face 403 (from coil spring 413 not shown) but is restrained from contact by a constricted opening 416 in the housing of plunger 410, the constricted opening being smaller in diameter than ball 412. This functions as a 'stop' or closure limiting element preventing the ball from reaching face 403. Accordingly, a minimum opening dimension 611 is established and remains fixed until nuts 411 are loosened and adjusted to set dimension 611 to a different value.

Another important dimension, maximum opening dimension 410, represents the maximum thickness of a clamped item that can be forced into the clamp without be stopped by the spring plunger housing 410. Because the 'at rest' minimum opening dimension 611 and the maximum 'forced' opening dimension 610 move together during adjustment of the spring plunger using nuts 411, the goal of adjusting the position of spring plunger on the second inward face is to ensure that dimensions 610 and 611 encompass the anticipated thickness of clamped items. Otherwise, the items inserted into the clamp concavity will either not experience pressure from ball 412 or will be entirely blocked from entry by striking against the housing of spring plunger 410.

FIG. 6B depicts the beginning of entry of items into the clamp, the items being progressively inserted generally along the direction shown by arrow 601. (in reality, the items may also be considered stationary and the clamp may be moved into engagement as shown.) It is evident that the combined thickness of the clamped items (build surface 220 and build plate 130) is less than the maximum opening dimension 610. Thus, the clamped items may slide along inward face 403 without being blocked by the housing of spring plunger 410. Upon reaching the progress shown, the clamped hems begin to contact ball 412 at point 620. Any further progress of insertion from into the clamp will be met with some resistance as ball 412 must thereafter be forced downward against spring pressure. The initial contact angle 622, being relatively small, provides for a transition from an unclamped condition to a fully clamped condition with a short advance of insertion along direction 601. The rolling action of ball 412 facilitates this transition by eliminating kinetic friction at point 620. Fine adjustment of nuts 411 against housing 410 can accomplish a degree of adjustment of both contact angle 622 and, in relation, the ultimate clamping force achievable.

FIG. 6C depicts the clamped items having fully entered the clamp, thereafter experiencing full clamping force as pinched between ball 412 and inward face 403. Of particular note, ball 412 is shown to be displaced into housing of spring plunger 410 by a displacement distance 613. This displacement distance, in conjunction with the spring constant of the spring plunger, determines the final clamping force applied to the clamped items once fully inserted. The displacement distance 613 is practically limited by the design of the spring plunger. For the particular model of spring plunger mentioned earlier, this displacement is limited to just under one tenth of an inch or roughly 2.5 mm.

Figure 7:
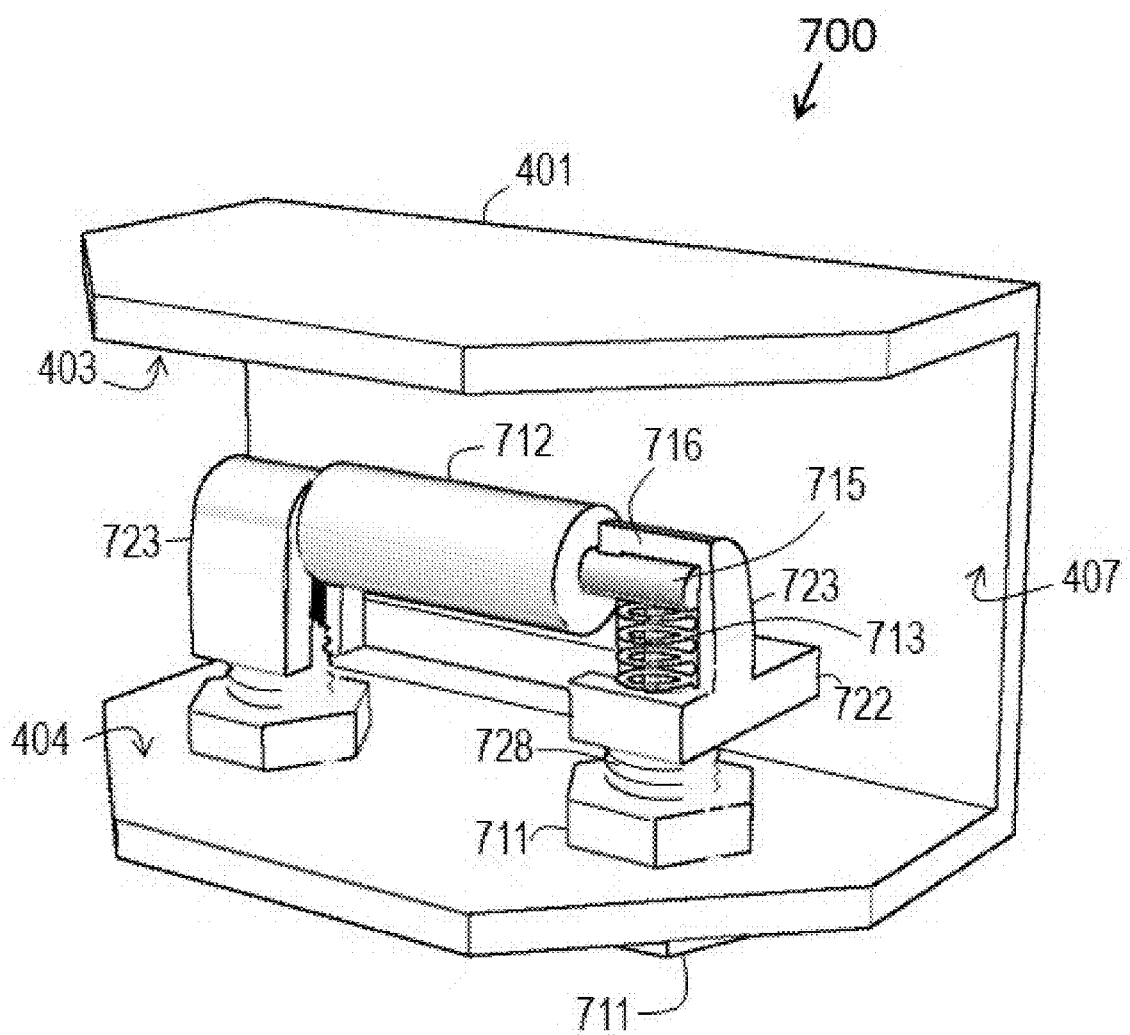
FIG. 7 shows an alternative design of a low profile clamping device in accordance with a preferred embodiment of the present teachings.

FIG. 7 depicts, as an alternative embodiment, a clamping device 700 involving a rotatable cylinder as a contacting member. As with clamping device 400, clamping device 700 comprises clamp frame 401 with inner faces 403 and 404 and exhibiting similar concave shape as described elsewhere herein. Clamping device 700 is shown to comprise a cylinder 712 which able to rotate on round shaft 715. Round shaft 715 is captured at either end within hollow posts 723 on either end of a carrier 722. One hollow post is shown partially cutaway to reveal the internal structure. Round shaft 715 slips into a vertical groove 724 of each hollow post. Each end of round shaft 715 is forced upward by a spring 713 inside the respective hollow post and yet is constrained in its vertical travel by an end cap portion 716 at the top of each post 723.

Each of the cylindrical hollows is at least partially threaded to each receive a screw 728 that serves to rigidly mount carrier 722 to frame 401 with help of nuts 711. Within each post 723, respective screw 728 also serves as the seat and retaining means for internal spring 713. It is worth noting that, if viewed from the side and sighting along the axis about which the cylinder rotates, the clamping device 700 very much resembles FIG. 4B and exhibits the same operation as set forth in FIGS. 6A-6C.

Specifically as to incorporating various aspects of the present teachings, clamping device 700 comprises the rigid frame 401 having a concavity and two portions designated as inward faces 403 and 404. Clamping device 700 comprises cylinder 712 as contacting member configured, just as ball 412, to contact and apply force to a clampable assembly and to rotate, on round shaft 715, about an axis perpendicular to a direction along which clamped items enter the concavity.

Clamping device 700 comprises springs 713 as force-maintaining elements which constantly press cylinder 712 in a direction towards face 403 (by pushing on shaft 715). The travel of shaft 715, and hence cylinder 712, is restrained by end cap portion 716 on each post 723. End cap portion 723 thus serves as a displacement-limiting element. Two screws 728 and four nuts 711 can be adjusted so set the position of carrier 722 relative to face 404 and, analogously to the plunger housing and nuts shown in FIG. 4B, can be used to adapt clamping device 700 to a specific range of minimum and maximum opening sizes corresponding to a nominal thickness expected for a given clampable assembly.

Aside from the implementation of a clamping device as shown in FIG. 7, yet another design is contemplated that involves attaching a rolling cylinder 712, carrier 722 and its related hardware as shown in FIG. 7 to alternative inward face 407. Springs 713 may be eliminated from this design and replaced with extended screws 728 driving far enough to engage shaft 715. Posts 723 may be small enough compared to the rolling cylinder 712 so that there is enough clearance for the cylinder to contact a clampable assembly. Adjustment of a minimum opening could be achieved by providing slotted holes through frame 401 at face 407 and tightening nuts 411 to fix the carrier assembly at a desired height. In this design, the lower part of frame 401—comprising face 403—may not be needed expect for handling convenience, so frame 401 may be a simple 'angle iron' rather than a full V-shaped channel. The force maintaining aspect may be in the form of flexure of the frame itself or may be accomplished using springs as part of the carrier assembly or by employing springy elements to build the carrier.

Figure 8:
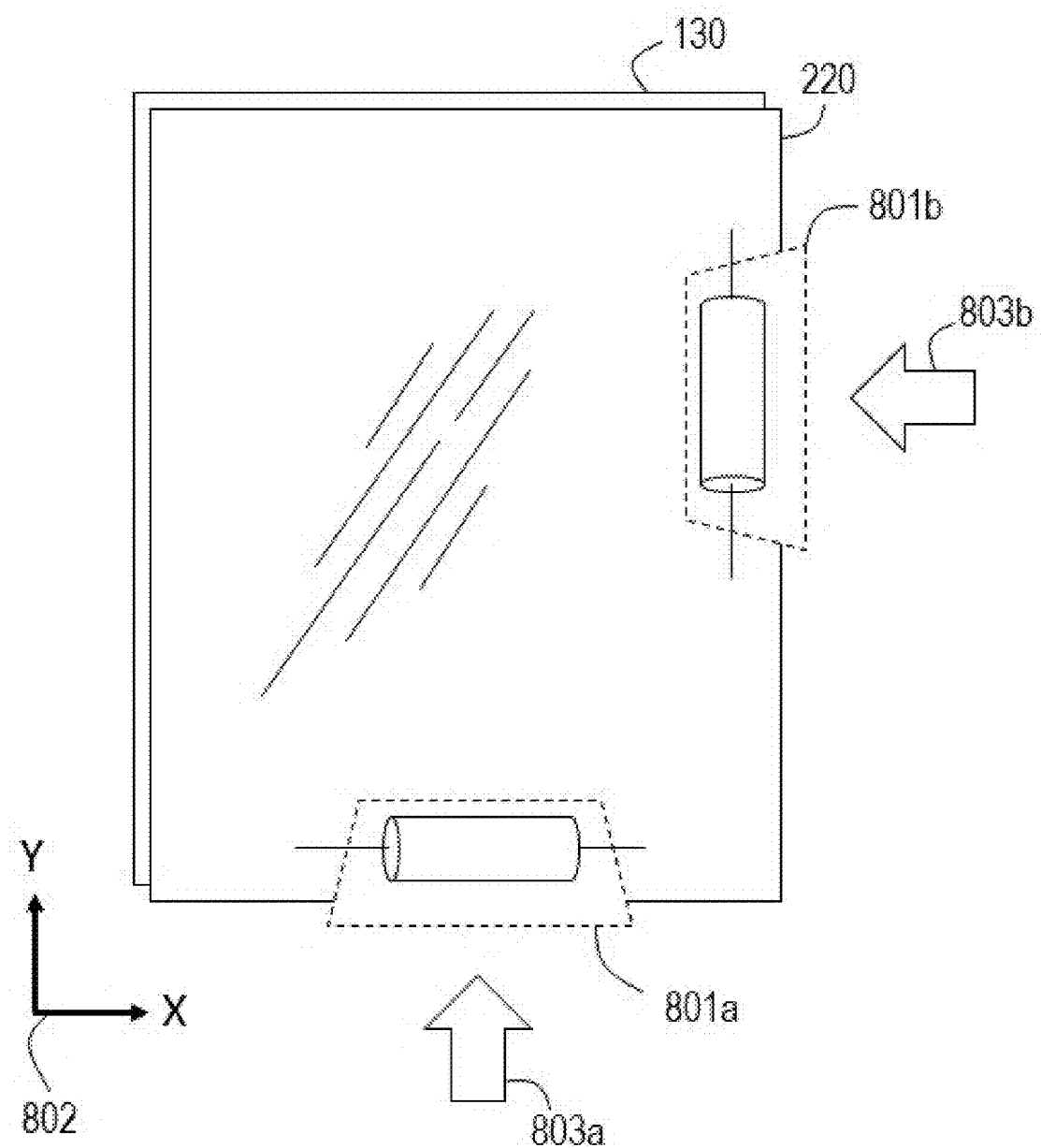
FIG. 8 is a pictorial to describe a method for deploying clamping devices that exhibit direction-dependent friction, the clamping devices having been made and applied in accordance with a preferred embodiment of the present teachings.

FIG. 8 is a conceptual sketch (not to scale) depicting how multiple clamps that each comprise a cylindrical contacting member, such as clamping device 700 as described in FIG. 7, may be utilized along two or more edges to operate in a complementary fashion to better secure a build surface to a build plate. Build surface 220 and build plate 130 are shown as view from above and with exaggerated offset. A direction legend 802 indicates the orientation of the X and Y axes which will be important for the explanation that follows.

At the outset, it should be pointed out the use of a cylindrical contacting member means that the clamping effect may be directional. Along the direction by which the clamp is moved into engagement with the clampable assembly, contact with a rolling cylinder reduces the friction of insertion. Once the clampable assembly is inserted and subjected to full clamping force, any lateral motion (normal to the direction of insertion) is impeded by static friction on both sides of the assembly—because the cylinder does not roll in that direction.

In the context of FIG. 8, a first clamp 801*a*, having a cylindrical contacting element as was introduced in FIG. 7, is shown to be pressed onto the combined edge of build surface 220 and build plate 130 by traveling along a direction shown by arrow 803*a*. Once clamp 801*a* is placed, the build surface 220 and build plate 130 are held together and prevented by sliding with respect to one another by three sources of friction. A first source of friction is between the build surface 220 and the inner face of the clamp that it directly contacts (effectively the same as face 403 shown elsewhere.) A second source of friction is between the build surface and build plate. A third source of friction is between the build plate and the cylindrical contacting member. This third source of friction is anisotropic because the cylinder rolls in a specific direction, exhibiting relatively low friction by turning one its shaft in one direction but behaving as a non-rolling surface in another direction. Accordingly, where clamp 801*a* is oriented as shown, the effectiveness at preventing build surface 220 from sliding atop build plate 130 along the X axis is some greater than its effectiveness at resisting sliding in the Y axis. Another clamp 801*b* is shown to have been placed from a different direction, by travel in the negative X direction or along a direction indicated by arrow 803*b*. Clamp 801*b* will contribute to holding build surface 220 against build plate 130, but will similar existing a direction-dependent frictional hold, being somewhat stronger at preventing motion in the Y axis than in the X axis.

Collectively, clamps 801*a* and 801*b*, achieve strong holding in both X and Y directions. (Of course, there will be normally be a plurality of such clamps along the periphery as was shown in FIG. 2.) It is important to note that a clamp using a ball-shaped contacting element as was described in FIGS. 4A-48 does not exhibit the same directionally increasing friction characteristic for the third source of friction mentioned above. A set of orthogonally placed clamps that employ cylindrical contacting elements may work in complementary fashion to achieve a greater hold to prevent sliding than clamps that use spherical contacting elements, all other factors being equal. This effect can be useful in implementations involving the build plate moving in two directions or where a material removal tool head relies on steady firm attachment and applies significant lateral forces and vibrations to a workpiece that is coupled to the build surface.

Another benefit of at least some designs embodying the present teachings, is that the force required to unseat and remove the clamps is very consistent for a given clamped dimension. Thus, despite applying strong clamping force, removal does not require loosening or tightening of any components, unlike many other types of clamps as were shown earlier.

A clamp operating according to the present teachings may also offer safety advantages due to the very limited range of displacement of spring-driven components. As the clamp and clampable assembly are drawn apart after use, the contacting components come to rest against a stop by the time the clamp totally clears the clamped pieces. Clamps comporting with the present teachings do not exhibit a lengthy spring-driven action that, if mishandled, may cause the clamp to spring out of the user's hands. One problem of many spring-based clamps stems from the fact that they are designed to accomplish a wide range of motion—including completely closing the clamp jaws. This creates a sudden pinching hazard for a user especially when the clamp must be reached from an arms-length away and must be applied and removed along a build plate edge that is farthest away and facing away from the user. In contrast, a clamp operating in accordance with the present teachings exhibits limited spring displacement (as little as 1-2 mm) and prevents any of the clamped piece parts from fully 'closing' against one another. During removal, for example, by virtue of the damping point of contact being recessed inside the concave channel, the spring-driven ball or cylindrical roller is already at the end of its travel before the clamp is fully clear of the clamped piece.

In some circumstances, build plate edge clamps can be difficult to reach or may become stuck to the clamped piece such as when an adhesive or slurry applied to the build surface incidentally reaches the clamp. In other cases, a user may need to remove such clamps while the clamped piece is hot to the touch, discouraging bare-handed grip. Accordingly, it may be necessary at times to use a soft hammer or other tool to tap the clamps off of the clamped piece. Performing this action with typical spring-action clamps can be dangerous because the clamps suddenly and uncontrollably snap off of the edge, releasing substantial potential energy and becoming projectiles in the build space. In contrast, the use of a recessed pivoting element having a limited-displacement spring-loaded design in accordance with some aspects of the present teachings ensures that the clamps simply drop free once they clear the clamped piece.

In contrast to a simple wedge-shaped concavity or a non-articulating solid 'clothes pin' type of clamp, a clamping device made and applied according to the present teachings, maintains a constant grip force even as the depth of insertion of clampable items varies somewhat. A simpler wedge shape, were it used as an alternative to the present teachings, may initially pinch onto the clamped items but then quickly loosen and release its grip due to vibration or thermal expansion.

In the preceding description, various exemplary embodiments have been described with reference to the accompanying drawings. It will be evident, however, that various modifications and changes may be made thereto, and that additional embodiments may be implemented, without departing from the scope of the invention as set forth in the claims that follow. The description and drawings are accordingly to be regarded in an illustrative rather than a restrictive sense.

What is claimed is:

1. A clamping device for applying clamping force to a clampable assembly, the clampable assembly comprising one or more items to be clamped upon insertion into the clamping device, the clamping device comprising:

a rigid frame having at least one concavity into which the clampable assembly enters the clamping device, wherein a first inward face of the concavity faces inwardly toward the middle of the concavity and is configured to contact the clampable assembly entering the clamping device and configured to apply a clamping force to the clampable assembly in a first direction inwardly toward the middle of the concavity and wherein a second inward face of the concavity, distanced from the first inward face, faces inwardly toward the middle of the concavity and wherein the rigid frame immovably holds the first inward face and second inward face at a permanently fixed distance regardless of whether or not the clampable assembly has entered the clamping device;

a contacting member, coupled to the second inward face, configured to make contact with the clampable assembly and to apply an inward clamping force upon the clampable assembly in a second direction substantially opposite to the first direction, the contact member configured to rotate about at least one axis perpendicular to a direction along which the clampable assembly enters the concavity;

a force-maintaining element configured to apply closing force to the contacting member in a direction generally towards the first inward face, the force-maintaining element applying closing force to the contacting member both with and without the clampable assembly having been inserted; and a displacement-limiting element configured to block the contacting member from making contact with first inner face due to the applied closing force.

2. The clamping device of claim 1 further comprising:
an adjustment element for, prior to the clampable assembly entering the concavity, changing the position of the contacting member relative to the second inward face to adjust a size of an opening formed between the contacting member and the first inward face, wherein the adjustment element is configured to remain in a rigidly fixed position once the clampable assembly has entered the concavity.

3. The clamping device of claim 1 wherein the contacting member is spherical in shape.

4. The clamping device of claim 1 wherein the contacting member is cylindrical in shape and is configured to contact the clampable assembly along a tangential surface of the cylindrical shape and to selectively rotate about a single axis perpendicular to the direction in which the clampable assembly enters the concavity.

5. The clamping device of claim 1 wherein the clamping device comprises a spring plunger having a housing coupled to the second inner face and wherein:
- a rotatable ball at one end of the spring plunger is configured to act as the contacting member;
- a spring coupled to the housing of the spring plunger presses upon the rotatable ball to act as the force-maintaining element; and
- a constricted opening disposed at the end of the housing and having a diameter that is smaller than a diameter of the rotatable ball acts as the displacement-limiting element.

6. The clamping device of claim 5 wherein the housing of the spring plunger is disposed within a hole through the rigid frame and repositionably coupled thereto using at least one threaded fastener and wherein repositioning of the housing of the spring plunger relative to the rigid frame changes the position of the contacting member relative to the second inward face to adjust a size of an opening formed between the contacting member and the first inward face.

7. The clamping device of claim 1 wherein, prior to entry of the clampable assembly, the contacting member is configured to be adjustable to a position opposite the first inward face so that, upon the clampable assembly subsequently entering the concavity, the clampable assembly becomes clamped due to the closing force without further adjustment of the position of the contacting member towards the first inner face.

* * * * *